Nov. 25, 1924.
T. DOUGHERTY
SLED BRAKE
Filed June 28, 1923
1,516,916
3 Sheets—Sheet 1
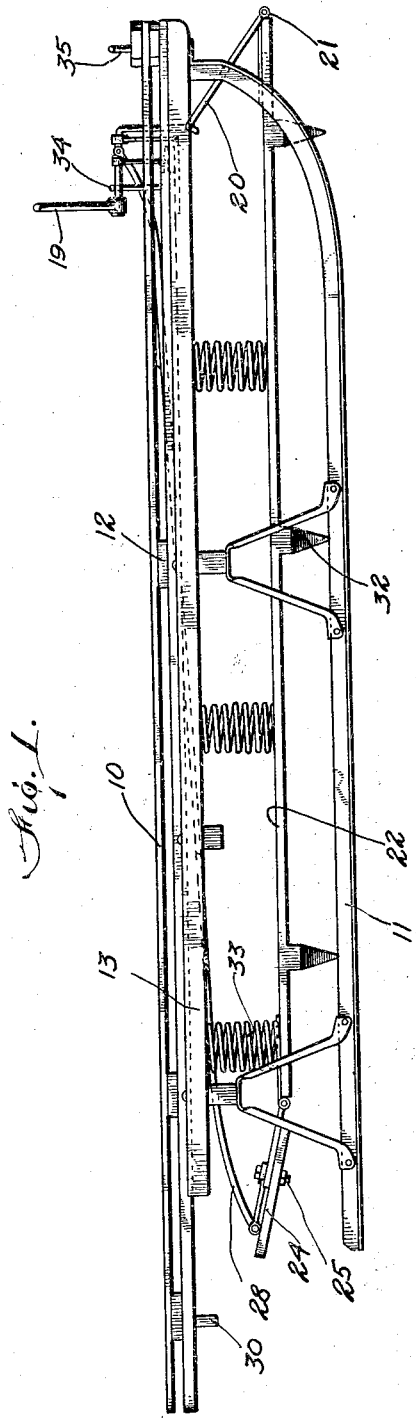
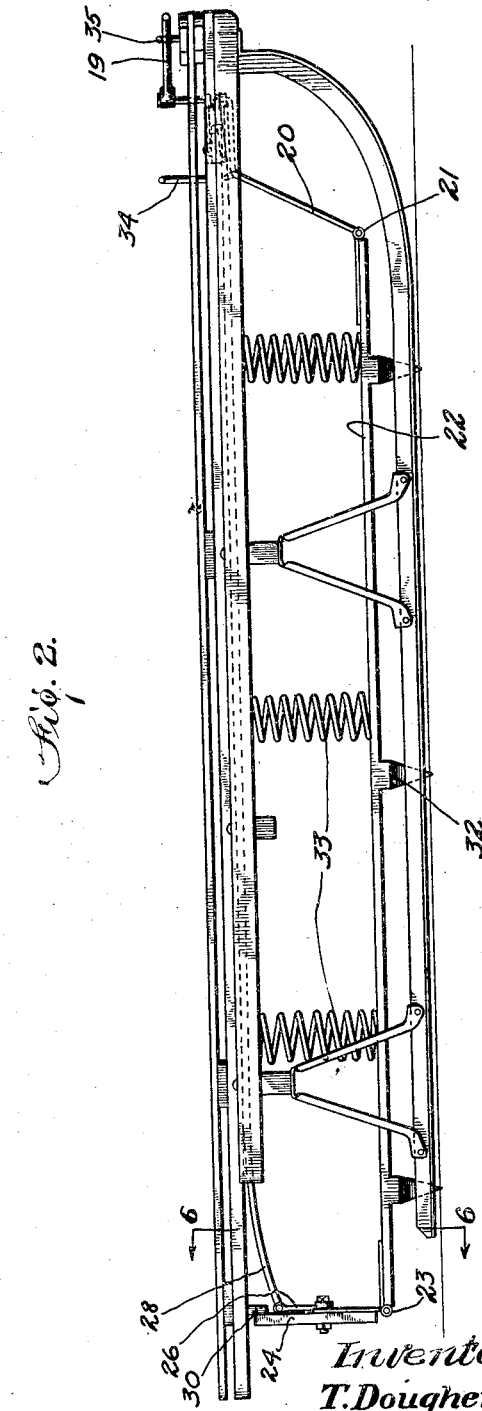
Inventor:
T. Dougherty Nov. 25, 1924.　　　　　T. DOUGHERTY　　　　　1,516,916
SLED BRAKE
Filed June 28, 1923　　　3 Sheets-Sheet 2
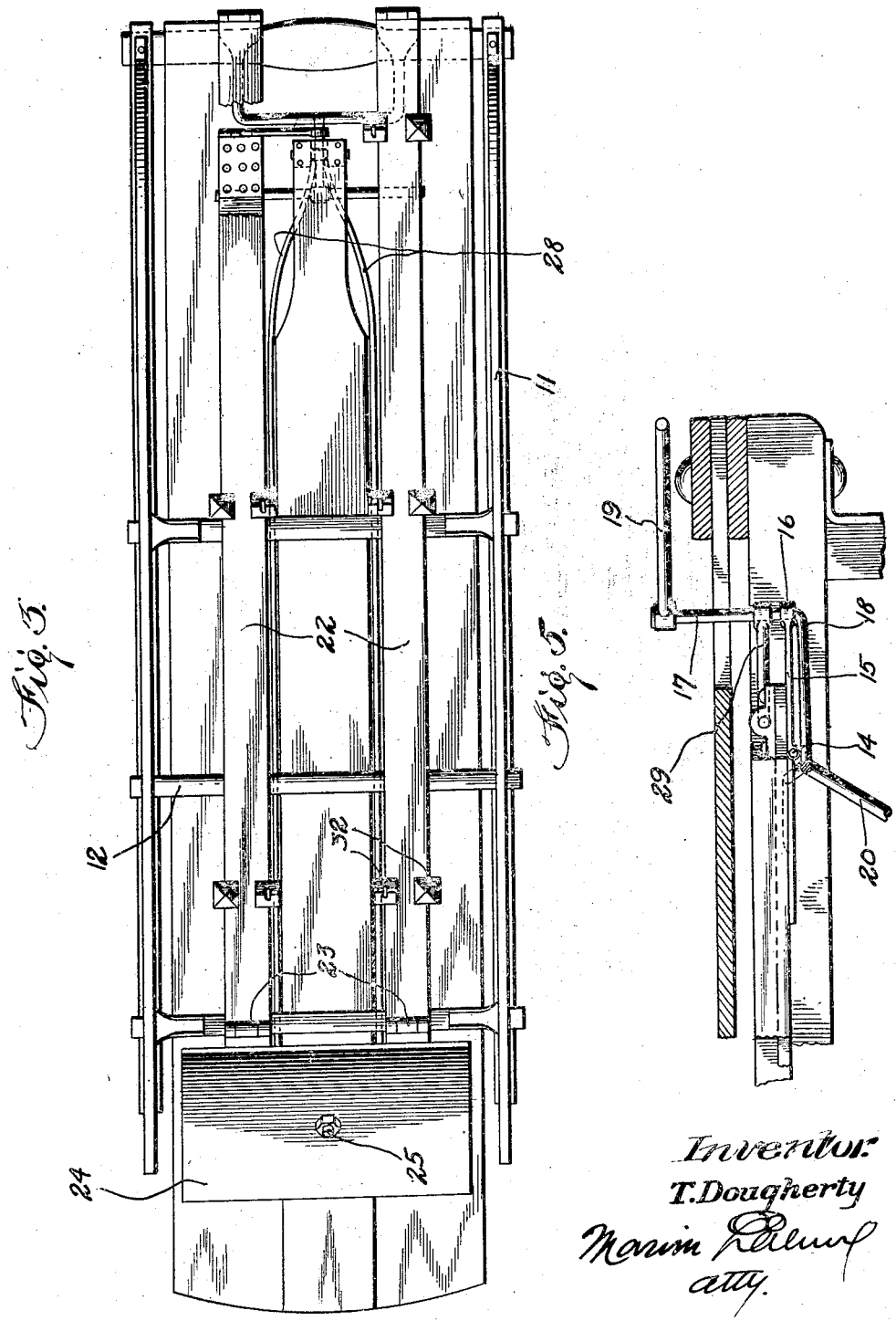
Inventor:
T. Dougherty
atty.

Nov. 25, 1924.  
T. DOUGHERTY  
SLED BRAKE  
Filed June 28, 1923  
1,516,916  
3 Sheets-Sheet 3

Inventor:  
T. Dougherty

Patented Nov. 25, 1924.

1,516,916

UNITED STATES PATENT OFFICE.

THOMAS DOUGHERTY, OF NEW YORK, N. Y.

SLED BRAKE.

Application filed June 28, 1923. Serial No. 648,209.

*To all whom it may concern:*

Be it known that I, THOMAS DOUGHERTY, a citizen of United States, residing at New York, in the county of New York and State of New York, have invented certain new and useful Improvements in Sled Brakes, of which the following is a specification.

This invention relates to improvements in sleds and has as its principal object to provide an effective braking means therefor.

A further object is to provide an efficient brake which is simple to operate and will not readily get out of order.

These and other like objects are attained by the novel construction, combination and arrangement of parts hereinafter described and shown in the accompanying drawings, forming a material part of this disclosure, and in which:—

Figure 1 is a side view of the sled showing the brake in an inoperative or raised position.

Figure 2 is a similar view showing the brake in an operative or lowered position.

Figure 3 is a bottom plan view of the sled.

Figure 5 is an enlarged sectional view showing the brake mechanism in detail.

Figure 4:
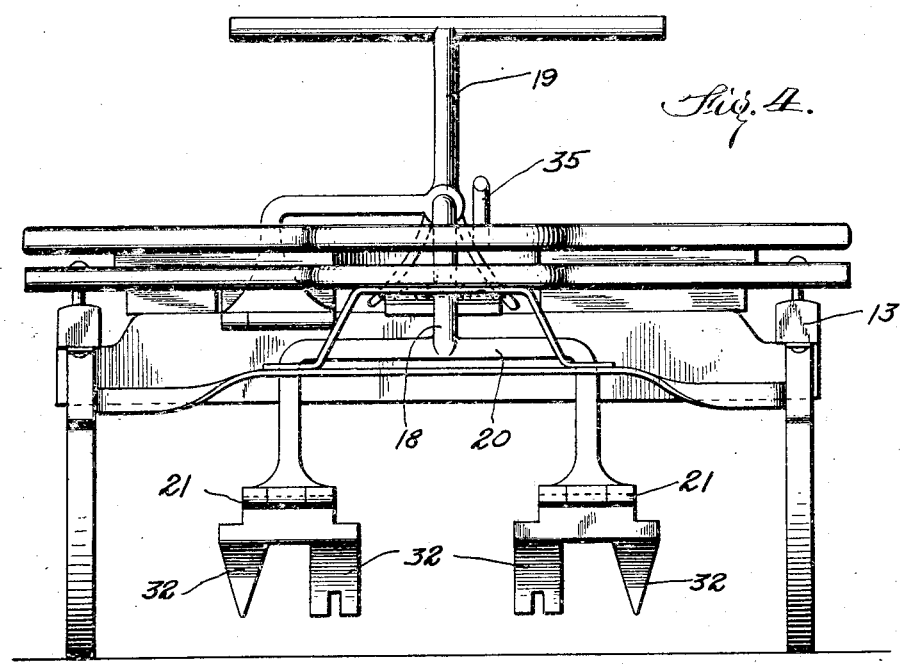
Figure 4 is a front elevational view of Figure 1 drawn to an enlarged scale.
Figure 6:
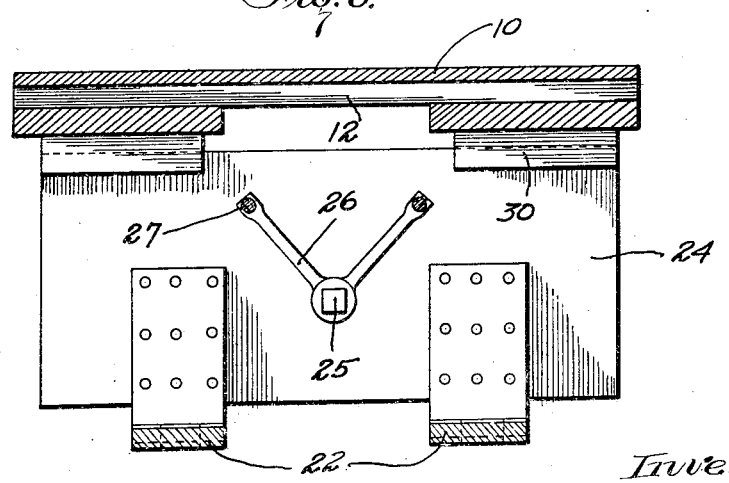
Figure 6 is an enlarged sectional view, taken on line 6—6 of Figure 2.

Referring to the drawing in detail, the numeral 10 designates the body of the sled provided with the customary runners 11. As is usual with sleds of the type shown, the body or platform 10 is composed of a series of longitudinally extending strips arranged in spaced parallel relation and secured by cross pieces 12 to the side rails 13 of the runners.

Connected by hinges 14 adjacent the forward end of one of the strips forming the platform 10, is an arm 15 formed at its free end with a bored boss 16 for the reception of the leg 17 of a right angled member, the other leg 18 of which extends parallel to the arm 15.

A T-shaped handle member 19 is secured to the end of the leg 17 and under normal conditions extends vertically as shown in Figures 1 and 4.

Rigidly secured to the end of the leg 18 and extending transversely of the sled is an inverted U-shaped member, to the ends of the arms 20 of which are hinges 21 connecting with the forward ends of spaced parallel longitudinal plates 22.

The rear ends of these plates are connected by hinges 23 to a transversely extending plate 24 having an opening to receive a bolt 25 by means of which the V-shaped bracket 26 is held in place. The ends of the arms of this bracket are provided with sockets to receive the rear ends of the actuating rods 28, their forward ends being pivotally secured, as at 29, to the leg 17 adjacent the arm 16.

Stops 30 are secured to the underside of the sled body or platform adjacent its rear end and co-operate with the platform 24 in the manner shown in Figure 2.

From the foregoing it will be seen that by manipulating the handle 19, the strips 22 may be raised or lowered at the will of the operator and in order to provide a braking effect, spurs 32 are arranged in pairs and in spaced relation, on the undersides of said bars in such a position that when the bars are lowered, the spurs will engage the surface over which the sled is travelling, thus effectively braking its momentum.

In order to assist in lowering the strips or bars 22, suitable compression springs 33 are interposed between the underside of the platform 10 and the upper sides of the strips.

Fixed in the platform are spaced hooks 34 and 35 used to hold the handle member either in vertical or horizontal position, and thereby locking the bars 19 in either running or braking position.

From the foregoing it will be seen that an effective and easily operated braking device for sleds has been obtained, which is relatively inexpensive to construct.

Having thus described my invention, what I claim as new and desire to secure by Letters Patent, is:—

1. The combination with a sled having a pair of parallel runners, of a longitudinally extending bar hingedly mounted at each end between the runners, a plurality of spaced spurs on said bar, and a single means to raise and lower said bar to cause the spurs to engage or disengage the surface traversed.

2. The combination with a sled having a pair of parallel runners, of a longitudinal bar mounted between the runners, a plurality of laterally and longitudinally spaced spurs on said bar, means to raise and lower said bar in planes parallel to the runners to cause the spurs to engage or disengage the surface traversed, and a plurality of coiled compression springs to force the bar downwardly.

3. The combination with a sled having runners, of a longitudinal bar hingedly mounted at its ends between the runners, a plurality of laterally and longitudinally spaced spurs on said bar, a single means to raise and lower the bar to cause the spurs to uniformly engage or disengage the surface over which the sled moves, and stops to limit the action of the bar when in raised or lowered position.

In witness whereof I have affixed my signature.

THOMAS DOUGHERTY.